(12) United States Patent
Cook et al.

(10) Patent No.: US 10,387,569 B2
(45) Date of Patent: Aug. 20, 2019

(54) AUTOMATED DOCUMENT ANALYSIS COMPRISING A USER INTERFACE BASED ON CONTENT TYPES

(71) Applicant: Freedom Solutions Group, LLC, Downers Grove, IL (US)

(72) Inventors: David A. Cook, Barrington, IL (US); Andrzej H. Jachowicz, Tower Lakes, IL (US); Phillip Karl Jones, Bartlett, IL (US)

(73) Assignee: FREEDOM SOLUTIONS GROUP, LLC, Downers Grove, IL (US)

( * ) Notice: Subject to any disclaimer, the term of this patent is extended or adjusted under 35 U.S.C. 154(b) by 0 days.

(21) Appl. No.: 15/249,377

(22) Filed: Aug. 27, 2016

(65) Prior Publication Data
US 2017/0060843 A1    Mar. 2, 2017

Related U.S. Application Data

(60) Provisional application No. 62/211,097, filed on Aug. 28, 2015.

(51) Int. Cl.
*G06F 17/30* (2006.01)
*G06F 17/27* (2006.01)
(Continued)

(52) U.S. Cl.
CPC .......... *G06F 17/278* (2013.01); *G06F 3/0481* (2013.01); *G06F 17/273* (2013.01);
(Continued)

(58) Field of Classification Search
CPC .... G06F 17/24; G06F 17/211; G06F 17/2705; G06F 17/273; G06F 17/277;
(Continued)

(56) References Cited

U.S. PATENT DOCUMENTS 5,632,002 A    5/1997    Hashimoto et al.
5,966,710 A *  10/1999   Burrows .......... G06F 17/30622
(Continued)

OTHER PUBLICATIONS

Z. Kozareva, "Boostrapping named entity recognition with automatically generated gazetteer lists," Proceedings of the Eleventh Conference of the European Chapter of the Association for Computer Linguistics: Student Research Workshop (EACL '06), Torino, Italy, Apr. 6, 2006, pp. 15-21.
(Continued)

*Primary Examiner* — Scott T Baderman
*Assistant Examiner* — Hassan Mrabi
(74) *Attorney, Agent, or Firm* — Finnegan, Henderson, Farabow, Garrett & Dunner LLP

(57) ABSTRACT

At least one processing device, operating upon a body of text in a document, identifies occurrences of at least one content type in the body of text. The at least one processing device thereafter generates a user interface that includes portions of text from the body of text that are representative of at least some of the occurrences of the at least one content type in the document. For each content type, the occurrences corresponding to that content type can be grouped together to provide grouped content type occurrences that are subsequently collated in the user interface. Those portions of text corresponding to the grouped content type occurrences may be arranged in alphanumeric order. The user interface may comprise at least a portion of the body of text as well as indicia indicating instances of the occurrences within the portion of the body of text.

9 Claims, 3 Drawing Sheets

(51) Int. Cl.
  *G06F 17/28* (2006.01)
  *G06F 3/0481* (2013.01)
(52) U.S. Cl.
  CPC ........ *G06F 17/2705* (2013.01); *G06F 17/277* (2013.01); *G06F 17/2775* (2013.01); *G06F 17/2785* (2013.01); *G06F 17/2795* (2013.01); *G06F 17/28* (2013.01); *G06F 17/274* (2013.01)
(58) Field of Classification Search
  CPC ............. G06F 17/2775; G06F 17/2785; G06F 17/2795; G06F 17/28; G06F 17/274; G06F 17/278; G06F 3/0481
  USPC .......................................................... 715/256
  See application file for complete search history.

(56) References Cited

U.S. PATENT DOCUMENTS

| | | | |
|---|---|---|---|
| 6,772,141 B1 * | 8/2004 | Pratt | G06F 17/30619 |
| 7,849,081 B1 * | 12/2010 | Chang | G06F 17/30719 707/727 |
| 8,280,719 B2 | 10/2012 | Miller | |
| 8,504,492 B2 | 8/2013 | Ghani et al. | |
| 2005/0084152 A1 | 4/2005 | McPeake et al. | |
| 2005/0143971 A1 * | 6/2005 | Burstein | G06F 17/274 704/4 |
| 2007/0230787 A1 | 10/2007 | Belitskaya et al. | |
| 2008/0249764 A1 * | 10/2008 | Huang | G06F 17/2785 704/9 |
| 2011/0119576 A1 * | 5/2011 | Aumann | G06F 17/2282 715/255 |
| 2012/0095993 A1 | 4/2012 | Shau | |
| 2017/0060836 A1 | 3/2017 | Cook et al. | |

OTHER PUBLICATIONS

A. Carlson et al., "Learning a Named Entity Tagger from Gazetteers with the Partial Perceptron," AAAI Spring Symposium: Learning by Reading and Learning to Read, Palo Alto, California, USA, Mar. 23, 2009, pp. 7-13.

International Preliminary Report on Patentability for International Application No. PCT/US2016/049165, dated Mar. 6, 2018, 8 pages.

* cited by examiner

| QTY | TEXT | CATEGORY |
|---|---|---|
| 1 | Beanz Corp. | COMPANY |
| 1 | Freedom So... | COMPANY |
| 1 | Microsoft | COMPANY |
| 1 | Microsoft C... | COMPANY |
| 1 | Microsystem... | COMPANY |
| 1 | Mizpeled Inc. | COMPANY |
| 1 | Mizpelled Inc. | COMPANY |
| 1 | $1 | CURRENCY |
| 1 | $5 | CURRENCY |
| 1 | $57.95 | CURRENCY |
| 1 | 8/24/16 | DATE |
| 1 | December 1... | DATE |
| 1 | Mount Vern... | LOCATION |
| 2 | Washington | LOCATION |
| 2 | Washington,... | LOCATION |
| 1 | Abraham | NAME |
| 1 | Abraham Li... | NAME |
| 1 | George | NAME |
| 1 | George Was... | NAME |
| 1 | Gorge | NAME |
| 1 | Honest Abe | NAME |
| 1 | Lincoln | NAME |

George Washington was the first president. He is on the $1 bill. George never lived in Washington state or Washington, D.C. Gorge lived in Mount Vernon for many years. He died on December 14, 1799.

Abraham Lincoln is on the $5 bill and was known as Honest Abe. When he was president, Lincoln lived in Washington, D.C.

Now I am writing about real companies, like Freedom Solutions Group, LLC (doing business as Microsystems), and fictional companies like Mizpelled Inc. Do you think Lincoln would have liked to work for a company named Mizpeled Inc.? Unlike Microsoft Corp., Microsystems is not headquartered in Washington.

On 8/24/16, the stock price for Microsoft closed at $57.95. My company is called Beanz Corp.

FIG. 5

AUTOMATED DOCUMENT ANALYSIS COMPRISING A USER INTERFACE BASED ON CONTENT TYPES

CROSS-REFERENCE TO RELATED APPLICATION

The instant application claims the benefit of Provisional U.S. Patent Application Ser. No. 62/211,097 entitled "USER INTERFACE INCORPORATING DISCOVERY OF COMPANY NAMES IN A DOCUMENT" and filed Aug. 28, 2015, the teachings of which are incorporated herein by this reference.

Additionally, the instant application is related to co-pending U.S. patent application Ser. No. 15/249,374 entitled "AUTOMATED DOCUMENT ANALYSIS COMPRISING MULTIPLE PASSES BY COMPANY NAME RECOGNITION COMPONENTS" and U.S. patent application Ser. No. 15/249,379 entitled "MITIGATION OF CONFLICTS BETWEEN CONTENT MATCHERS IN AUTOMATED DOCUMENT ANALYSIS", both filed on even date herewith, the teachings of which are incorporated herein by this reference.

FIELD

The instant disclosure relates generally to devices that perform automated document analysis and, in particular, to generation of a user interfaces by such devices based on content types.

BACKGROUND

Devices, typically suitable programmed computing devices, that perform automated document analysis are well known in the art. Examples of products that perform automated document analysis include the "CONTRACT COMPANION" proofreading system provided by Freedom Solutions Group, L.L.C. (doing business as Microsystems). Among other features, such systems operate to automatically analyze documents in order to identify potential errors. For example, such systems can typically locate spelling errors or identify defined terms. Systems such as the "CONTRACT COMPANION" proofreading system can further identify more subtle issues such as inconsistently used phrases within a document.

While such proofreading systems now offer relatively sophisticated functionality, even relatively well established functions such as identification of spelling errors in text still have room for improvement. For example, the occurrence of names (as a specific type of content that can include, for example, company names, product names, medicine names, new technologies, etc.) can be problematic for spell checkers because many names do not appear in standard spelling dictionaries, because they are acronyms (e.g., "ABCOM"), are made up words (e.g., "Fizzbang"), or are intentionally misspelled (e.g., "Coolz Headfonz, Inc."). As such, standard spelling and grammar technologies are not able to assist the reviewers in catching mistakes.

Typos in company names and other identifiers (product names, medicine names, new technologies, etc.) can be difficult to review, because many names do not appear in dictionaries because they are acronyms (ABCOM), are made up (Fizzbang), or are intentionally misspelled ("Coolz Headfonz, Inc."). As such, standard spelling and grammar technologies are not able to assist the reviewers in catching mistakes.

Thus, techniques and devices that overcome the operational shortcomings of prior art devices/products and improve operation of the man-machine interface (to at least the extent that more errors are identified and presented) would represent a welcome advancement in the art.

SUMMARY

The instant disclosure describes techniques for generating a user interface by automated document analysis systems that addresses the above-noted shortcomings of the prior art. In particular, in one embodiment, at least one processing device, operating upon a body of text in a document, identifies occurrences of at least one content type in the body of text. The at least one processing device thereafter generates a user interface that includes portions of text from the body of text that are representative of at least some of the occurrences of the at least one content type in the document. When generating the user interface, the at least one processing device can, for each content type, group at least a portion of the occurrences corresponding to that content type provide grouped content type occurrences and thereafter generate the user interface in which the grouped content type occurrences for that content type are collated in the user interface. Further, those portions of text corresponding to the grouped content type occurrences may be arranged in alphanumeric order within the use interface. Further still, the user interface may comprise at least a portion of the body of text as well as indica indicating instances of the occurrences within the portion of the body of text forming a part of the user interface.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

FIG. 5. is an illustration of an example of a user interface in accordance with the instant disclosure.

DETAILED DESCRIPTION OF THE PRESENT EMBODIMENTS

Figure 1:
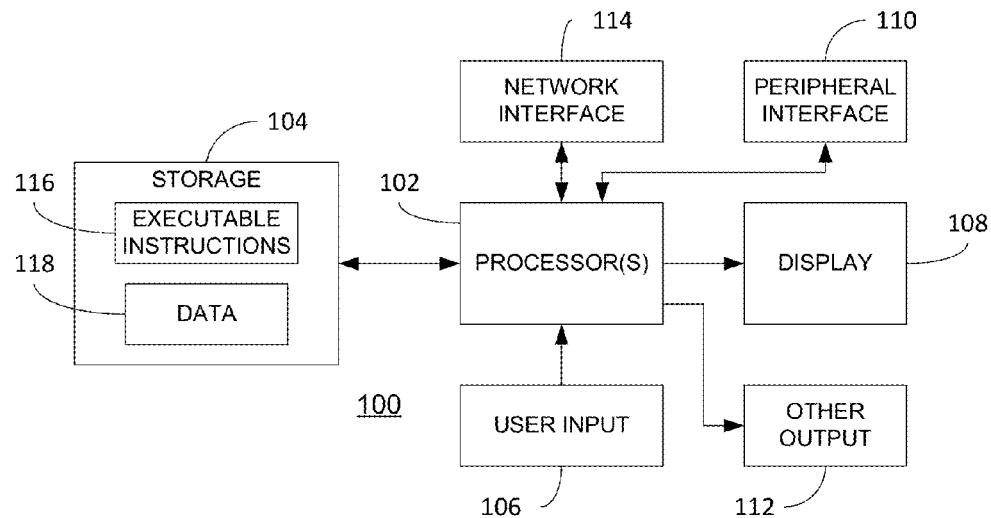
FIG. 1 is a block diagram of a device that may be used to implement various embodiments in accordance with the instant disclosure.

Referring now to FIG. 1, a representative device or machine 100 that may be used to implement the teachings of the instant disclosure is illustrated. The device 100, which may be embodied by, for example, a desktop, laptop or handheld computer, server computer or the like, may be used to implement one or more content type recognition components (CTRCs) and perform the processing described in greater detail below. Regardless, the device 100 comprises at least one processing device 102 coupled to a storage component or memory 104. The storage component 104, in turn, comprises stored executable instructions 116 and data 118. In an embodiment, the processor 102 may comprise one or more of a microprocessor, microcontroller, digital signal processor, co-processor or the like or combinations thereof capable of executing the stored instructions 116 and operating upon the stored data 118. Likewise, the storage component 104 may comprise one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, network-based storage, etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may comprise one or more user input devices 106, a display 108, a peripheral interface 110, other output devices 112 and a network interface 114 in communication with the at least one processing device 102. The user input device 106 may comprise any mechanism for providing user input (such as inputs specifying a document to be analyzed) to the processor 102. For example, the user input device 106 may comprise a keyboard, a mouse, a touch screen, microphone and suitable voice recognition application or any other means whereby a user of the device 100 may provide input data to the at least one processing device 102. The display 108, may comprise any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices or any other input source used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the least one processing device 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a device 100 is illustrated in FIG. 1, it is understood that a combination of such devices may be configured to operate in conjunction (for example, using known networking techniques) to implement the teachings of the instant disclosure.

Figure 2:
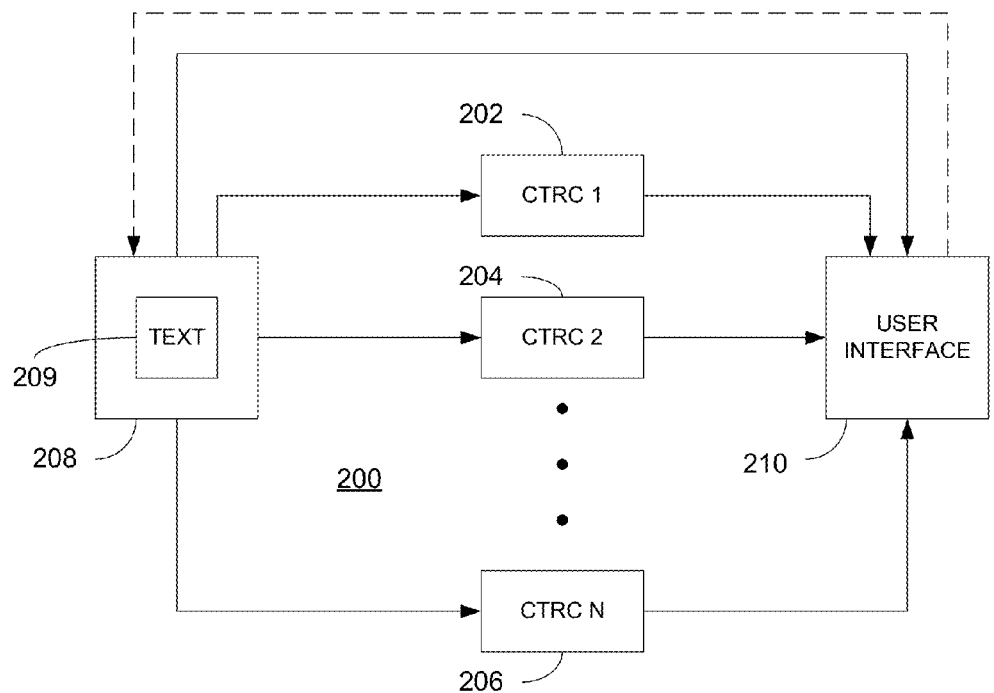
FIG. 2 is a block diagram schematically illustrating a system for performing automated document analysis and generating a user interface in accordance with the instant disclosure.

FIG. 2 is a block diagram schematically illustrating a system 200 for performing automated document analysis and generating a user interface in accordance with the instant disclosure. As shown, the system 200 comprise at least two CTRCs 202-206; in the illustrated example, N different CTRCs, where N>2, are shown. Each of the CTRCs 202-206, which may be implemented by the device 100 illustrated in FIG. 1, operate upon a document 208 comprising a body of text 209. As used herein, a given content type specifies individual words or groups of words in the body of text having in common traits or characteristics that distinguish them as a group or class. More particularly, in an embodiment, each content type described herein is differentiated by its semantic significance, i.e., by the kinds of information conveyed by words fitting within that content type. For example, by way of non-limiting example, content types that may be used when generating a user interface include "names," "locations," "dates," "currencies," etc. As further used herein, an occurrence of a content type is a word or group of words found within the text of a document that may be deemed as fitting within that content type. For example, various occurrences of a "location" content type include "USA," "Chicago," "Wrigley Field," "1901 North Roselle Road," etc.

Consequently, each of the CTRCs 202-206 implements a different content type recognition technique. For example, recognition techniques specifically directed to each of the above-mentioned content type examples are well known in the art, and are typically based on predefined dictionaries of known words or regular expressions configured to identify patterns typically associated with a given content type. Within any given content type, specifically tailored CTRCs may be employed. For example, within the "name" content type, specialized techniques for identifying occurrences of company names may be employed, a presently preferred example of which is further described in co-pending U.S. patent application Ser. No. 15/249,374 filed on even date herewith and entitled "AUTOMATED DOCUMENT ANALYSIS COMPRISING MULTIPLE PASSES BY COMPANY NAME RECOGNITION COMPONENTS" the teachings of which are incorporated herein by this reference. It is noted that the teachings of the instant disclosure are not limited to any particular content type or content type recognition technique, which may be selected as a matter of design choice.

As used herein, the document 208 may comprise any electronic document in which the individual elements forming the body of text 209 may be accessed, and includes (but is not limited to) document created using any known word processing program, e.g., the "MICROSOFT" Word processing program. While the examples described herein are set forth in the English language, it will be appreciated that the devices and techniques described herein may be equally applied to virtually any language. In fact, as will be appreciated by those having skill in the art, known techniques may be used to split the body of text 209, regardless of the underlying language, into meaningful elements thereof often referred to tokens typically consisting of individual words, but also possibly including phrases (e.g., "et al"), numbers (e.g., "60601"), symbols (e.g., "$"), punctuation (e.g., ","), individual characters or other groupings of characters of such (e.g., "U.S.").

Those having skill in the art will appreciate that various types of "preprocessing" of the document 208 may be performed in accordance with known techniques prior to processing in accordance with the instant disclosure. For example, a tokenizer may operate upon the text 209 in order to identify individual tokens or groups thereof. Further still, a part of speech label (e.g., noun, verb, adjective, etc.) may be assigned to each word or token in the text 209. In an embodiment particularly applicable to company names, roman numerals and superscripted numbers are preprocessed because roman numerals are often part of company names (e.g., Freedom Solutions Holding II), whereas superscripted numbers are not (e.g., Apple Computer3). Further still, in an embodiment, casing of words (i.e., upper case, lower case, mixed cases, capitalized) may also be preprocessed.

As further shown in FIG. 2, a user interface 210 is provided based on the occurrences of the various content types as determined by the CTRCs 202-206, as well as the body of text 209. In an embodiment, described in greater detail below, the user interface 210 comprises data displayed on a suitable display that includes portions of text from the body of text 209 that are representative of any occurrences of the various content types identified by the CTRCs 202-206. Additionally, the user interface 210 may include a portion of the body of text 209 having indica set forth therein corresponding to any instances of the occurrences with that portion of the body of the text. As will be appreciated by those having skill in the art, techniques for implement the user interface 210 are well known in the art and need not be described in greater detail herein. As further shown in FIG. 2 by the dotted line from the user interface 210 to the document 208, data indicative of a selection received via the user interface may be used to effectuate changes in the body text 209. For example, if the user interface 210 reveals one or more typographical errors in specific occurrences of the at least one content type, the selection data may correspond to user input in which an occurrence having a typographical error is corrected or deleted in the body of text 209. Once again, techniques for receiving such selection data via the user interface 201 and basing changes to the body of text 209 upon such selection data are well known in the art.

Figure 3:
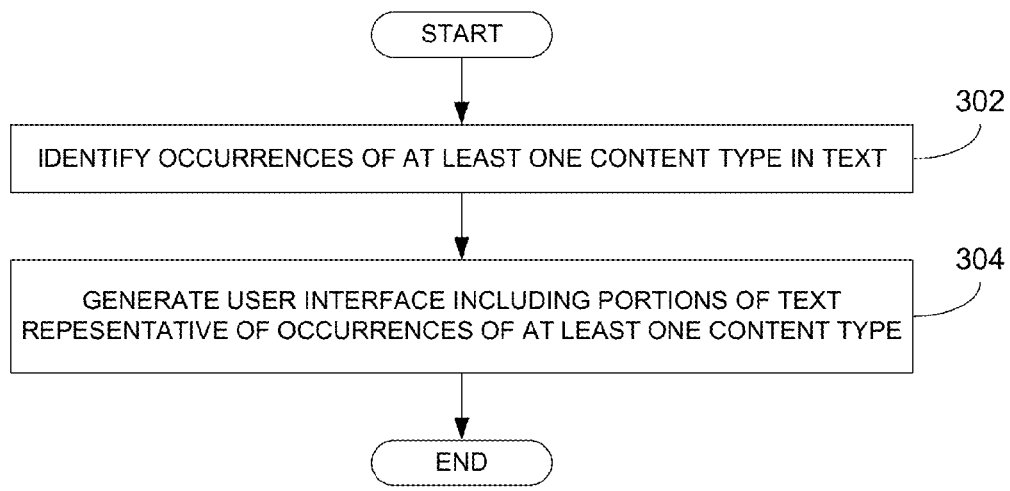
FIG. 3 is a flowchart illustrating a first embodiment of processing for automated document analysis in accordance with the instant disclosure.

Referring now to FIG. 3, processing in accordance with a first embodiment of the instant disclosure is described. Beginning at block 302, occurrences of at least one content type are identified in a body of text. As noted above, this may be accomplished by executing one or more CTRCs 202-206 each implementing a different content type recognition technique. Thereafter, at block 304, a user interface is generated that includes portion of text representative of at least some of the occurrences of the at least one content type. An example of this is illustrated in FIG. 5, where a user interface 502 has a results display panel 504 in addition to a text display panel 506. As shown, the text display panel 506 sets forth at least a portion of the body of text under consideration, whereas the results display panel 504 sets forth the portions of text 520 corresponding to occurrences of the at least content type identified in the body of text. As further shown, each occurrence may also set forth its corresponding content type 518 as well as the number of times 522 that the specific occurrence was identified in the body of text (which may be tracked by the corresponding CTRC).

Figure 4:
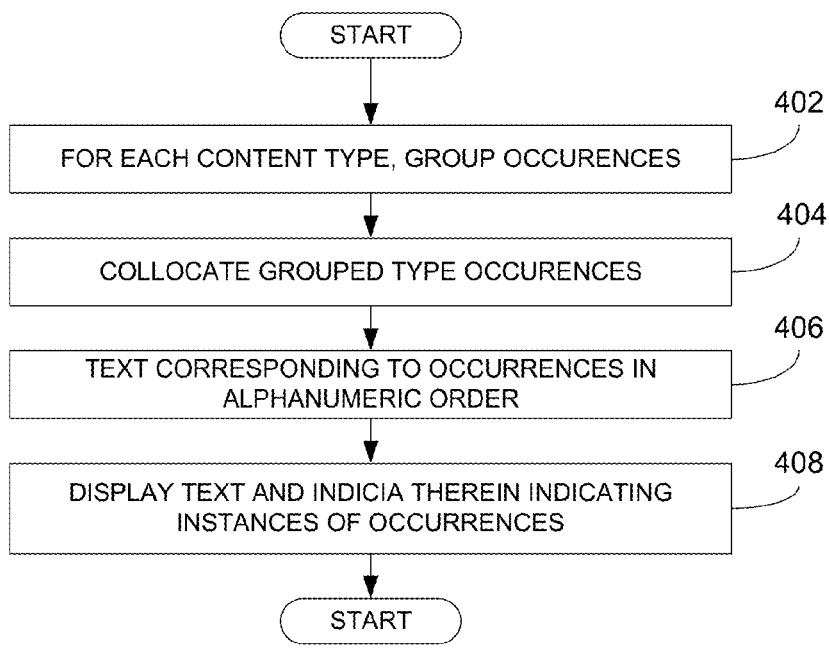
FIG. 4 is a flowchart illustrating a second embodiment of processing for automated document analysis in accordance with the instant disclosure.

Referring now to FIG. 4, additional processing in accordance with a second embodiment of the instant disclosure is described. In particular, the processing of FIG. 4 describes further features concerning generation of the user interface. In this embodiment, processing begins at block 402 where, for each content type, any identified occurrences are grouped together to provided grouped content type occurrence. Thereafter, at block 404, for each content type, the grouped content type occurrences are collated within the user interface. An example of this is illustrated in FIG. 5 where various content types 518 are shown. In the illustrated example, the content types 518 include a "company" type, a "currency" type, a "date" type, a "location" type and a "name" type. For each of these content types, grouped content type occurrences 508-516 are displayed together within the results display panel 504.

Referring once again to FIGS. 4 and 5, processing at block 406 causes the portions of text 520 corresponding to the grouped content type occurrences 508-516 to be arranged in alphanumeric order. For example, within the grouped content type occurrences 508 for the "company" type, the portions of text 520 are arranged in alphabetical order. Alternatively, within the grouped content type occurrences 510 for the "currency" type, the portions of text 520 are arranged in numerical order. However, it will be appreciated by those of skill in the art that ordering within the grouped content type occurrences may be based on other factors, such as the number of times 522 that each occurrence is identified in the text or the positional order in which each occurrence is found in the body of text (i.e., occurrences closer to the beginning of the body of text are listed prior to occurrences closer to the end of the body of text). In another embodiment, not illustrated in FIG. 5, occurrences comprising potential errors or warnings can be sorted preferentially to the top of whatever portion of the results display panel 504 they are displayed in (while still sorted alphabetically and/or categorically within such list of errors/warnings) so that a human proofreader can act on the most immediate changes first.

Further, as shown at block 408, indicia corresponding to the occurrences of the content types may be provided within that portion of the body of text currently displayed in the text display panel 506. In the illustrated example, these indicia comprise underlining applied to each occurrence of the content types found in the displayed portion of the body of text. As will be appreciated by those of skill in the art, various other techniques to highlight or otherwise indicate the presence of the occurrences in the body of text may be employed, e.g., different text or background colors, font sizes, font styles or combinations thereof.

By generating a user interface based on content type as described herein, it becomes possible to recognize potential typographical errors that may not be readily identified using prior art techniques. More specifically, by displaying occurrences according to content types, discrepancies may be more readily recognized. For example, with reference to FIG. 5, the CTRC responsible for "name" content type 516 may have identified "Gorge" as a name of a person given its context (i.e., "Gorge lived"), particularly since "Gorge" would not necessarily be detected as a spelling error. Being displayed along with other "name" content type occurrences, it becomes more readily evident that "Gorge" was likely a spelling error. In a similar vein, within the "company" content type 508, the separate occurrences of "Mizpeled Inc." and "Mizpelled Inc." (differing by a single letter "l") are possibly ambiguous since the company name appears to be a deliberate misspelling. However, by virtue of being displayed along with each other, a possible discrepancy may be readily recognized and corrected if necessary.

In the embodiment illustrated in FIG. 5, each occurrence is displayed along with its grouped content type occurrences. However, such grouping, or not as the case may be, may be based on other factors. In an embodiment, if one occurrence is an acceptable variant of another occurrence, these otherwise non-identical occurrences may be displayed together. For example, if an instance of text is properly possessive, it may be grouped with the non-possessive form to keep the list in the results display panel 504 shorter. In this case, then, "Acme's anvil technology" and "Acme shall" could both be combined to a single listing of "Acme" associated with the company category.

Alternatively, display of the occurrences could be dictated in part by whether a given instance is also associated with an error indication. For example, a system may check for defined terms, in addition to recognizing specific content types as described herein. In such systems, the occurrence of a name in the text prior to usage of that same name as part of a definition, could give rise to a simultaneous identification of the first usage of the name and an error for being used prior to the definition. As an example, it is assumed that one or more usages in a document of "Apple" appear before defining "Apple Computer Inc (dba Apple)", and that one or more usages of "Apple" also appear after defining "Apple Computer Inc (dba Apple)." In this case, the first usages of "Apple" would flag an error to the extent that they occur prior to the definition in the document, whereas the later usages of "Apple" after the definition would not flag a defined terms error. In this case, then, the usages of "Apple" associated with the defined terms error could be listed separately in the results display panel 504 from those occurrences of "Apple" that are not associated with any error (which would otherwise be listed as part of grouped content type occurrences).

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method, by at least one processing device configured to perform automatic document analysis of a document comprising a body of text, for generating a user interface that facilitates identification of errors in the body of text, the method comprising:
    identifying, by the at least one processing device, occurrences of at least one content type in the body of text;
    for each content type of the at least one content type, grouping, by the at least one processing device, at least a portion of the occurrences corresponding to the content type to provide grouped content type occurrences, wherein the occurrences correspond to the content type and are acceptable variants of each other, and wherein the grouping excludes from the grouped content type occurrences any occurrences identified by the errors; and
    generating, by the at least one processing device, the user interface including portions of text from the body of text representative of at least some of the occurrences of the at least one content type, the user interface further comprising the grouped content type occurrences collocated within the user interface,
    wherein, for each of the at least one content type, those portions of text corresponding to the grouped content type occurrences are arranged in the user interface in alphanumeric order or a positional order in which each occurrence is found in the body of text.

2. The method of claim 1, wherein the at least one content type comprises names, locations, dates or currencies.

3. The method of claim 1, wherein generating the user interface further comprises displaying at least a portion of the body of text and providing indicia indicating instances of the occurrences within the portion of the body of the text.

4. An apparatus configured to perform automated document analysis of a document comprising a body of text and to generate a user interface that facilitates identification of errors in the body of text, the apparatus comprising:
    at least one processing device; and
    memory operatively connected to the at least one processing device, the memory comprising executable instructions that when executed by the at least one processing device cause the at least one processing device to:
    identify occurrences of at least one content type in the body of text;
    group at least a portion of the occurrences corresponding to the content type to provide grouped content type occurrences, wherein the occurrences correspond to the content type and are acceptable variants of each other, and wherein the grouping excludes from the grouped content type occurrences any occurrences identified by the errors; and
    generate a user interface including portions of text from the body of text representative of at least some of the occurrences of the at least one content type, the user interface further comprising the grouped content type occurrences collocated within the user interface,
    wherein, for each of the at least one content type, those portions of text corresponding to the grouped content type occurrences are arranged in the user interface in alphanumeric order or a positional order in which each occurrence is found in the body of text.

5. The apparatus of claim 4, wherein the at least one content type comprises names, locations, dates or currencies.

6. The apparatus of claim 4, wherein those executable instructions operative to generate the user interface further comprise executable instructions that, when executed by the at least one processor, cause the at least one processor to display at least a portion of the body of text and provide indicia indicating instances of the occurrences within the portion of the body of the text.

7. A non-transitory computer readable medium comprising executable instructions that when executed by at least one processing device cause the at least one processing device to perform automated document analysis of a document comprising a body of text and to generate a user interface that facilitates identification of errors in the body of text in which the at least one processing device is caused to:
    identify occurrences of at least one content type in the body of text;
    group at least a portion of the occurrences corresponding to the content type to provide grouped content type occurrences, wherein the occurrences correspond to the content type and are acceptable variants of each other, and wherein the grouping excludes from the grouped content type occurrences any occurrences identified by the errors; and
    generate a user interface including portions of text from the body of text representative of at least some of the occurrences of the at least one content type, the user interface further comprising the grouped content type occurrences collocated within the user interface, wherein, for each of the at least one content type, those portions of text corresponding to the grouped content type occurrences are arranged in the user interface in alphanumeric order or a positional order in which each occurrence is found in the body of text.

8. The non-transitory computer readable medium of claim 7, wherein the at least one content type comprises names, locations, dates or currencies.

9. The non-transitory computer readable medium of claim 7, wherein those executable instructions operative to generate the user interface further comprise executable instructions that, when executed by at least one processor, cause the at least one processor to display at least a portion of the body of text and provide indicia indicating instances of the occurrences within the portion of the body of the text.

* * * * *

UNITED STATES PATENT AND TRADEMARK OFFICE
CERTIFICATE OF CORRECTION

PATENT NO. : 10,387,569 B2  
APPLICATION NO. : 15/249377  
DATED : August 20, 2019  
INVENTOR(S) : David A. Cook et al.

Page 1 of 1

It is certified that error appears in the above-identified patent and that said Letters Patent is hereby corrected as shown below:

On the Title Page

Item (57), Line 10 of ABSTRACT, "collated" should read --collocated--.

Item (57), Line 14 of ABSTRACT, "indica" should read --indicia--.

Signed and Sealed this  
Twenty-sixth Day of November, 2019

Andrei Iancu  
*Director of the United States Patent and Trademark Office*